United States Patent
Turner et al.

(10) Patent No.: US 7,146,261 B2
(45) Date of Patent: Dec. 5, 2006

(54) VEHICLE CONTROL SYSTEM FOR EXITING RUTS

(75) Inventors: Marcus Turner, Coventry (GB); Ian Hulme, Leamington Spa (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/858,876

(22) Filed: Jun. 3, 2004

(65) Prior Publication Data

US 2005/0273239 A1 Dec. 8, 2005

(51) Int. Cl.
*B60T 8/00* (2006.01)
*B60T 8/176* (2006.01)

(52) U.S. Cl. .................. 701/41; 180/197; 340/901
(58) Field of Classification Search .............. 701/41, 701/70, 90, 91, 71, 78, 80, 82, 83; 180/197; 303/139, 146, 140, 143, 196; 340/901, 905
See application file for complete search history.

(56) References Cited

U.S. PATENT DOCUMENTS

| | | | |
|---|---|---|---|
| 4,965,878 A | | 10/1990 | Yamagiwa et al. ......... 364/424 |
| 5,011,235 A | * | 4/1991 | Arikawa .................... 303/149 |
| 5,732,371 A | * | 3/1998 | Fujita ......................... 701/38 |
| 5,864,769 A | * | 1/1999 | Inagaki et al. .............. 701/70 |
| 5,960,376 A | * | 9/1999 | Yamakado et al. ......... 702/141 |
| 6,471,196 B1 | * | 10/2002 | Stiller ..................... 267/64.16 |
| 6,564,140 B1 | * | 5/2003 | Ichikawa et al. ............. 701/91 |
| 2004/0230375 A1 | * | 11/2004 | Matsumoto et al. ........ 701/301 |

FOREIGN PATENT DOCUMENTS

| | | |
|---|---|---|
| EP | 1541402 | 6/2005 |
| GB | 2344326 | 6/2000 |

* cited by examiner

*Primary Examiner*—Dalena Tran
(74) *Attorney, Agent, or Firm*—Frank A. MacKenzie

(57) ABSTRACT

A vehicle control system adapted to facilitate exiting of ruts includes an active steering system having a steerable wheel defining a steering angle. The active steering system also includes a steering wheel providing a driver input control angle, the active steering system further including a coupler component, an actuator component, a controller component, and a sensor component. The components of the active steering system are operably interconnected such that the controller component can selectively vary the steering angle relative to the driver input control angle. The steering angle defines an expected vehicle yaw when the steerable wheel is not slipping on a contact surface such as a road surface. The sensor component is configured to provide the controller with a signal corresponding to an actual yaw angle of a vehicle. The vehicle control system also includes a braking system adapted to brake selected wheels of a vehicle. The controller is configured to determine if a vehicle is in a rut based at least in part upon the expected vehicle yaw and the actual yaw angle. The controller provides the braking signal to brake wheels on a first side of a vehicle more than on a second side to generate a yaw torque tending to increase the actual yaw angle and thereby facilitate exiting of a rut.

21 Claims, 3 Drawing Sheets

VEHICLE CONTROL SYSTEM FOR EXITING RUTS

BACKGROUND OF THE INVENTION

The present invention relates to a motor vehicle, and in particular to an active braking and front steering system for a motor vehicle.

Active front steering systems for motor vehicles are used to rotate the wheels of the vehicle at a different rate than the rotation of the steering wheel of the vehicle or without rotation of the steering wheel. The ratio of the rotation of the steering wheel to the rotation of the wheel defines a steering ratio. The active front steering system therefore sets the steering ratio of the vehicle. Without the active front steering system, the steering ratio is typically only determined by the ratio set by the mechanical connections between the steering wheel and the wheel of the vehicle.

Heretofore, active front steering systems have included a powered actuator operably connected to a rack of a rack-and-pinion system of a vehicle. The active front steering system assists in pivoting the steerable wheels. In basic operation, the active front steering system typically augments a driver input control angle from the driver as applied to the steering wheel, via the powered actuator, to rotate the wheels according to the steering ratio.

Vehicles may also include an anti-lock braking system ("ABS") that includes sensors and a controller to control the torque supplied to a wheel to prevent or limit slipping of the wheel on a road or other contact surface. Known brake systems may also selectively brake a driven wheel to limit the torque supplied by the driveline to prevent or reduce slipping during acceleration.

SUMMARY OF THE INVENTION

One aspect of the present invention is a vehicle control system adapted to facilitate exiting of ruts. The vehicle control system includes an active steering system having a steerable wheel defining a steering angle. The active steering system also includes a steering wheel providing a driver input control angle, the active steering system further including a coupler component, an actuator component, a controller component, and a sensor component. The components of the active steering system are operably interconnected such that the controller component can selectively vary the steering angle relative to the driver input control angle. The steering angle defines an expected vehicle yaw when the steerable wheel is not slipping on a contact surface such as a road surface. The sensor component is configured to provide the controller with a signal corresponding to an actual yaw angle of a vehicle. The vehicle control system also includes a braking system adapted to brake selected wheels of a vehicle. The controller is configured to determine if a vehicle is in a rut based at least in part upon the expected vehicle yaw and the actual yaw angle. The controller provides the braking signal to brake wheels on a first side of a vehicle more than on a second side to generate a yaw torque tending to increase the actual yaw angle and thereby facilitate exiting of a rut.

Another aspect of the present invention is a vehicle control system including at least one vehicle control device that can be manually manipulated by a driver to vary a vehicle control parameter. The control system also includes a controller that selectively varies at least one vehicle control parameter to provide a yaw moment acting on the vehicle tending to displace the vehicle in a yaw sense. The controller determines if the vehicle is in a rut by comparing the driver's desired direction of travel to the vehicle's actual direction of travel. The controller includes a rut exiting function including varying the at least one vehicle control parameter to provide a yaw moment tending to displace the vehicle in a yaw sense in the driver's desired direction of travel to thereby facilitate exit of the rut.

Yet another aspect of the present invention is a motor vehicle including a chassis, a power train, and a vehicle control system. The chassis includes at least one steerable wheel defining a steering angle. The power train includes an engine and a transmission coupled thereto. The vehicle control system includes a controller, an active steering system coupled to the controller, and a braking system that is also coupled to the controller. The active steering system includes a steerable wheel defining a steering angle and a steering wheel providing a driver input control angle. The active steering system further includes a coupler component, an actuator component, a controller component, and a sensor component. The components of the active steering system are operably interconnected such that the controller component can selectively vary the steering angle relative to the driver input control angle. The steering angle defines an expected vehicle when the steerable wheel is not slipping. The sensor component is configured to provide the controller with a signal corresponding to an actual yaw angle of a vehicle. The controller determines if the vehicle is in a rut, and controls the braking system and the active steering system to generate a yaw moment tending to displace the vehicle in a yaw sense to thereby enable the vehicle to exit a rut.

These and other features, advantages, and objects of the present invention will be further understood and appreciated by those skilled in the art by reference to the following specification, claims and appended drawings.

DETAILED DESCRIPTION OF THE PREFERRED EMBODIMENTS

For purposes of description herein, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
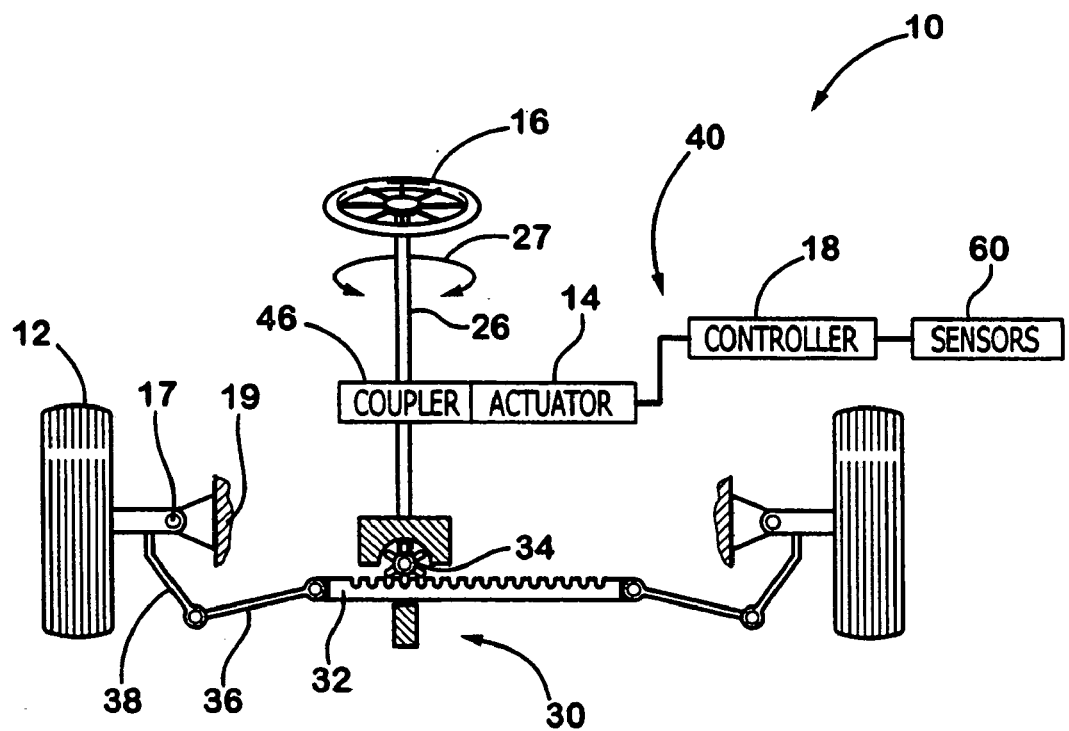
FIG. 1 is a partially schematic view of a steering system embodying the present invention, wherein a steering angle is 0°.

Referring to FIG. 1, reference number 10 generally designates a steering system for a motor vehicle embodying the present invention. In the illustrated example, the steering system 10 comprises a steerable wheel 12 defining a steering angle 20 (see FIG. 2), a powered actuator 14 controlling the steering angle and a steering wheel 16 providing a driver input control angle. The ratio of the driver input control angle to the steering angle defines a steering ratio. The steering system 10 also includes a controller 18 for selectively varying the steering ratio based, at least in part, upon road conditions.

In the illustrated example, the steering system 10 includes a pair of the steerable wheels 12 that pivot about a pivot point 17 with respect to a vehicle frame 19. Each wheel defines the steering angle 20 (FIG. 2) between the longitudinal axis 22 of the associated vehicle and a central travel axis 24 of each wheel 12. It should be noted that while the steering angle 20 is defined by the pivotal movement of each of steerable wheels 12, the steering angle 20 may be defined by pivotable rear wheels if the vehicle is so equipped, and/or any other pivotable wheels.

The illustrated steering system 10 also includes a steering column 26 rotatable in a direction represented by an arrow 27, and operable to receive the driver input control angle from an operator of the vehicle via the steering wheel 16. The steering column 26 is operably linked to the steerable wheels 12 via a rack-and-pinion system 30 that includes a rack 32 and a pinion gear 34, a pair of drag links 36, and a steering arm 38. Although the present example utilizes a rack-and-pinion steering system, it should be noted that other steering systems compatible with the steering system 10 described herein may be utilized.

The steering system 10 further includes a basic active front steering system 40 that includes the controller 18 in operable communication with the powered actuator 14. The powered actuator 14 is operably connected to the rack 32 of the rack-and-pinion system 30 via a coupler 46. The active front steering system 40 assists in pivoting the steerable wheels 12. Although a particular kind of active front steering system is described herein, other systems known in the art my be utilized. In basic operation, the active front steering system 40 augments the driver input control angle from the driver as applied to the steering wheel 16, via the powered actuator 14. The steering angle 20 as defined by the steerable wheel 14 is determined by a combination of the driver input control angle and an additional steering angle supplied by the powered actuator 14. The additional steering angle supplied by the powered actuator 14 is determined by the following equation:

$$\alpha_{ASA} = \delta_{DICA}((R_A - R_D)/R_D);$$

wherein $\alpha_{ASA}$=the additional steering angle supplied by the powered actuator 14, $\delta_{DICA}$=the angle change of the steering wheel 16 as determined by the driver input steering angle, $R_A$=the steering ratio of the vehicle without the additional steering angle and $R_D$=the desired steering ratio. For example, if the steering ratio of the steering system 10 without the powered actuator 14 is 1 (e.g., turn the steering wheel 16 five degrees and the steerable wheel 12 will turn five degrees), the desired steering ratio is 5 (i.e., slow change of the steering angle 20 of the steerable wheel 12 compared to the change of angle of the steering wheel 16) and the steering wheel 16 has moved five degrees, the powered actuator 14 will move the steerable wheel 12 negative four degrees. Therefore, the steering wheel 16 will rotate five degrees and the steerable wheel 12 will rotate one degree, thereby providing the vehicle with a steering ratio of 5.

Figure 2:
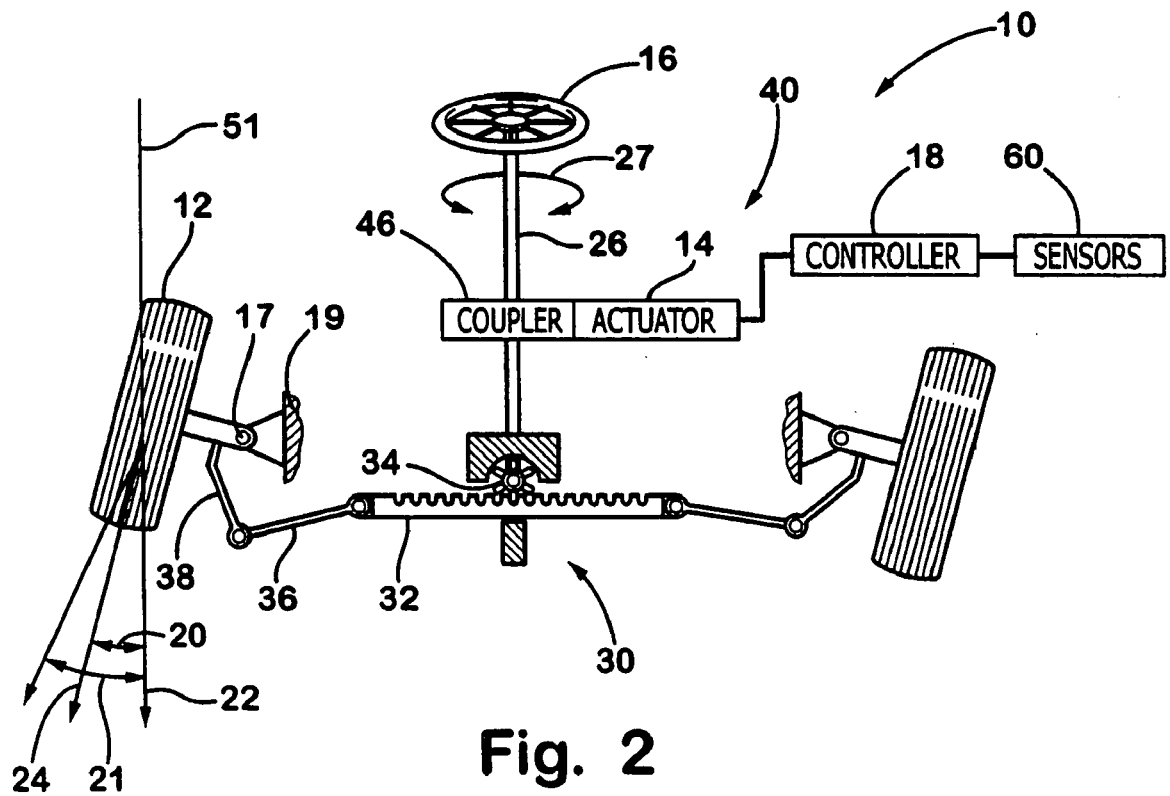
FIG. 2 is a partial schematic view of the steering system pivoted to a non-zero steering angle.
Figure 3:
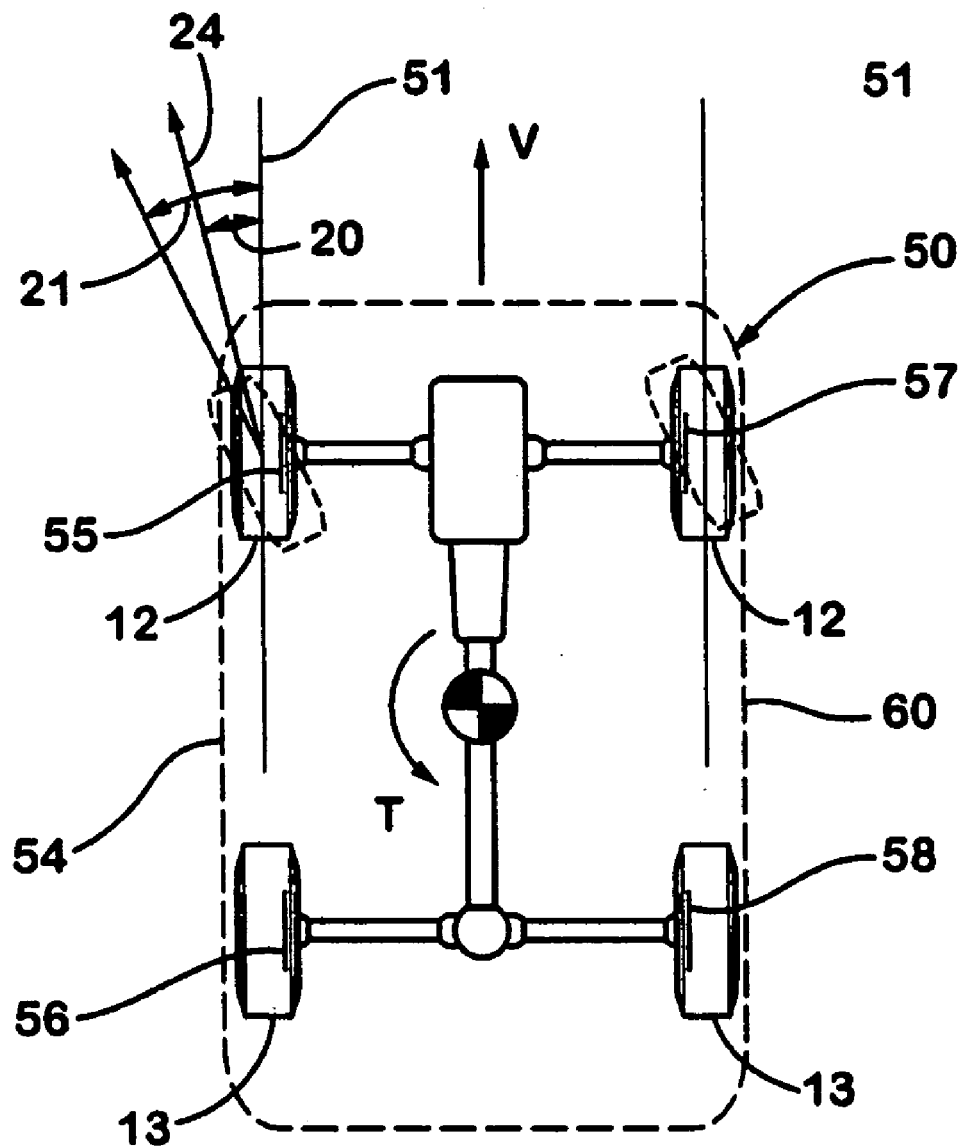
FIG. 3 is a schematic top plan view of a vehicle including a vehicle control system according to the present invention.
Figure 4:
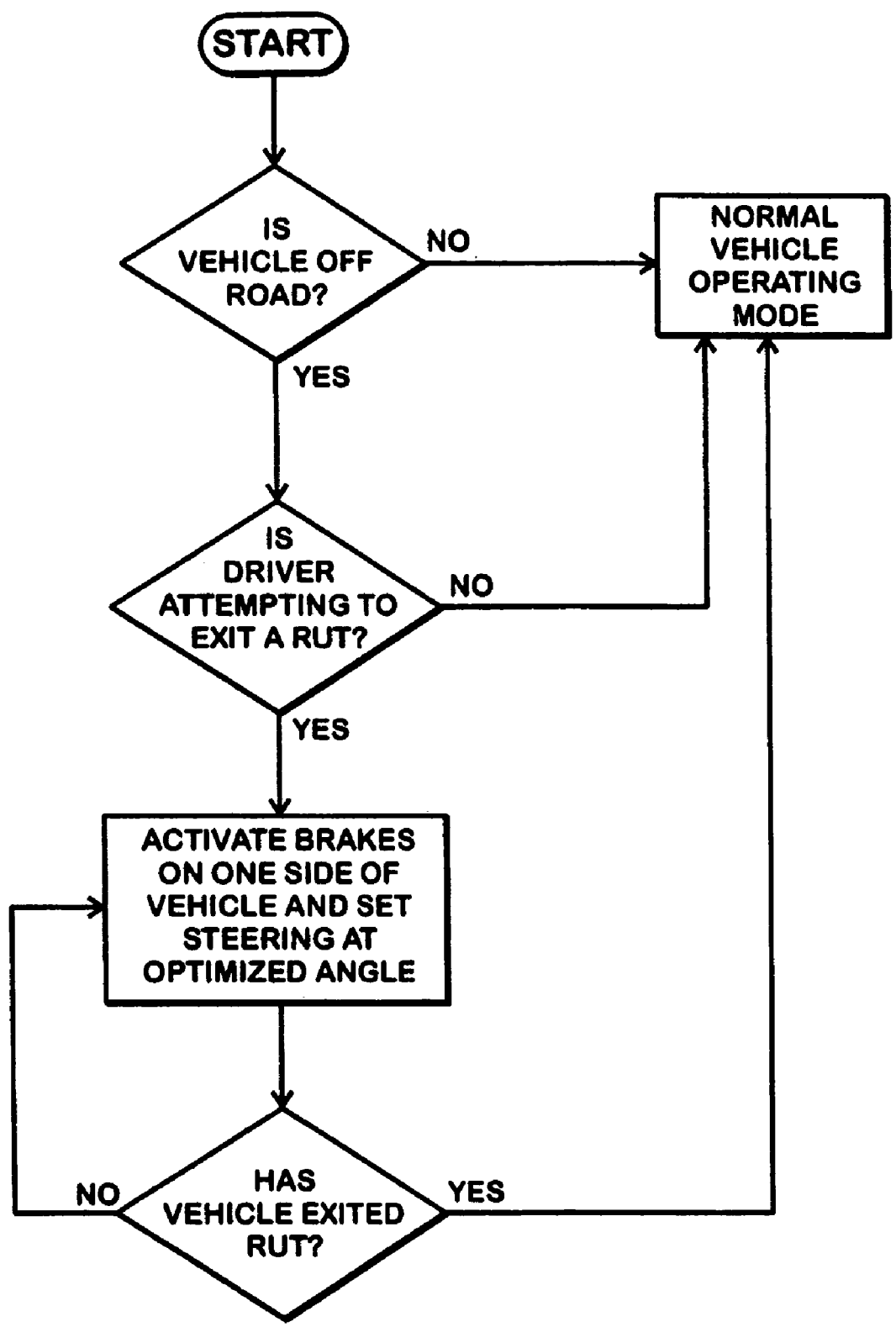
FIG. 4 is a flow chart illustrating the operation of the vehicle control system of the present invention.

With reference to FIGS. 2 and 3, when a vehicle 50 is traveling with its steerable wheels 12 and non-steerable wheels 13 in ruts 51, the vehicle 50 will tend to continue to travel along the ruts 51 despite steering inputs by the driver. For example, if the ruts are deep enough and/or the coefficient of friction between the wheels 12 and 13 and the ground surface is insufficient, the steerable wheels 12 may be positioned at an angle 20 in an effort to cause the vehicle 50 to travel along the travel axis 24. However, the vehicle will tend to continue traveling along the rut 51.

The present invention relates to a control system that facilitates exiting of such ruts. The controller 18 first determines if the vehicle 50 is in an off road condition. The controller may determine if the vehicle is off road based upon low speed differences between vehicle response and driver input, including both lateral response and longitudinal response. Detection of low tire and/or road friction at high temperatures may also be utilized. Also, large wheel travel differential may be detected to determine if the vehicle is off road. In order to avoid an erroneous determination that the vehicle is off road upon encountering a curve, the controller 18 may make the determination that the vehicle is off road only if a predetermined number of large wheel travels have occurred within a predetermined time period. Another method for determining that the vehicle is in off road condition may include detecting road roughness by use of accelerometers in conjunction with the vehicle speed. Still further, in all wheel drive vehicles, sensors may determine if the differential lock condition or low ratio gear box is actuated, and thereby determine that an off road condition is present. Alternately, dynamic low frequency wheel loads, roll bar deflections, ACE logic signals, air suspension logic, DSC signals, engine management signals, GPS signals, and/or a driver setting an on/off road switch may all be utilized to determine if an off road condition is present.

If the controller 18 determines that the vehicle is in an off road condition, the controller 18 will then determine if the vehicle is stuck in a rut. The controller 18 determines if the "stuck in a rut" condition has been encountered by determining if the vehicle 50 is traveling down a path that the driver does not want the vehicle 50 to travel down. During operation, the sensors 60 determine both the driver input control parameters, and the actual vehicle operating parameters, and the controller 18 compares the parameters to determine if the "stuck in a rut" condition has been encountered. For example, the controller 18 may compare the vehicle's actual yaw angle to the expected yaw angle based upon the steering angle 20 or other input control parameter. The expected yaw angle may be calculated based upon the steering angle 20. The actual yaw angle of the vehicle 50 may be calculated utilizing known methods. For example, accelerometers may be utilized to measure the yaw acceleration, and the yaw acceleration may then be numerically integrated to determine the actual yaw angle. Other vehicle operating parameters such as the actual vehicle speed and the like may be compared to the driver input control parameters to determine if the "stuck in a rut" condition is present.

Once the controller 18 has determined that the vehicle is off road and that the "stuck in a rut" condition is present, the controller 18 then actuates the active steering system 10 and/or the vehicle brake system to generate an additional yaw moment tending to increase the yaw angle and facilitate exit of the vehicle 50 from the ruts 51. For example, if the "stuck in a rut" condition is present, the controller 18 may generate a signal to the steering system 10 to increase the steering angle from 20 to 21 to generate an additional yaw moment. This increase in the steering angle from 20 to 21 occurs even though the operator has not rotated the steering wheel 16 beyond the position that would otherwise result in the steering angle 20. The magnitude of the angle 21 may be determined based upon a number of vehicle operating parameters and turning conditions. For example, the angle 21 may be retrieved in a look up table of optimum steering angles. The optimum steering angles may be based upon test data or the like, such that the optimum angle is based upon the co-efficient of friction of the wheels 12 on the road surface, vehicle speed, or other operating parameters.

When the "stuck in a rut" condition has been detected, the controller 18 may also selectively brake the brakes on one side of the vehicle to generate an additional yaw moment tending to cause the vehicle 50 to exit the rut 51. For example, with reference to FIG. 3, if the controller 18 determines that the vehicle 50 is stuck in a rut, the controller 18 may generate a signal to the brakes 55 and 56 on a first side 59 of the vehicle 50 that is greater than the braking on the brakes 57 and 58 on a second side 60 of the vehicle 50. Because the vehicle 50 is traveling forward at a velocity indicated by the arrow "V", a yaw torque indicated by the arrow "T" will be generated that tends to cause the vehicle 50 to exit the ruts 51.

Significantly, the controller 18 may provide additional or optimized steering angle when the "stuck in a rut" condition is expected either alone, or in combination with selective braking to either the first side 59 or second side 60 of the vehicle 50. Alternately, the controller 18 may provide only selective braking when the "stuck in a rut" condition is encountered, without providing additional steering input. Thus, the controller 18 may utilize selective control of the steering and braking systems upon determining that the "stuck in a rut" condition is present. Furthermore, the controller 18 may limit the determination of the "stuck in a rut" conditions wherein the vehicle is traveling at less than a predetermined velocity. Also, a switch that is manually operable by the operator may be provided to disable the "stuck in a rut" operating condition, such that the controller 18 does not control the vehicle steering and braking systems according to the rut exiting manner described above. Alternately, a switch could be provided to manually put the controller 18 into the rut exiting mode described above to facilitate exiting of a rut even under conditions wherein the controller 18 did not determine that the vehicle was, in fact, in a rut.

In the foregoing description, it will be readily appreciated by those skilled in the art that modifications may be made to the invention without departing from the concepts disclosed herein. Such modifications are to be considered as included in the following claims, unless these claims by their language expressly state otherwise.

We claim:

1. A vehicle control system adapted to facilitate exiting of ruts, comprising:
    an active steering system including a steerable wheel defining a steering angle and a steering wheel providing a driver input control angle, said active steering system further including a coupler component, an actuator component, a controller component, and a sensor component, said components operably interconnected such that said controller component can selectively vary said steering angle relative to said driver input control angle, said steering angle defining an expected vehicle yaw when said steerable wheel is not slipping on a contact surface;
    said sensor component configured to provide said controller component with a signal corresponding to an actual yaw rate of a vehicle;
    a braking system adapted to brake selected wheels of a vehicle;
    said controller component configured to determine if a vehicle is in a rut based at least in part upon said expected vehicle yaw and said actual yaw rate, said controller component providing a braking signal to brake wheels on a first side of a vehicle more than on a second side to generate a yaw torque tending to increase said actual yaw rate and thereby facilitate exiting of a rut.

2. The vehicle control system of claim 1, wherein:
    said controller component varies said steering angle based, at least in part, upon said expected vehicle yaw and said actual yaw rate.

3. The vehicle control system of claim 2, wherein:
    said controller component provides a steering signal that positions said steerable wheel at an optimum steering angle for exiting a rut.

4. The vehicle control system of claim 3, wherein:
    said controller component provides said steering signal based, at least in part, on whether the difference between the expected vehicle yaw and the actual yaw rate is greater than a predetermined amount.

5. The vehicle control system of claim 4, wherein:
    said controller component defines at rut exiting mode when providing a braking signal to brake wheels on the first side of a vehicle more than on the second side; and including:
    a switch that permits a user to manually turn the rut exiting mode on and off.

6. The vehicle control system of claim 4, wherein:
    said controller component utilizes a look up table to determine said optimum steering angle based upon at least one vehicle operating parameter.

7. The vehicle control system of claim 1, wherein:
    the steering angle is a percentage of the driver input control angle.

8. A vehicle control system, comprising:
    at least one vehicle control device that can be manually manipulated by a driver to vary a vehicle control parameter;
    a controller that selectively varies at least one vehicle control parameter to provide a yaw moment acting on the vehicle tending to displace the vehicle in a yaw sense;
    said controller determining if the vehicle is in a rut by comparing the driver's desired direction of travel to the vehicle's actual direction of travel; and wherein:
    said controller includes a rut exiting function including varying said at least one vehicle control parameter to provide a yaw moment tending to displace the vehicle in a yaw sense in the driver's desired direction of travel to thereby facilitate exit of the rut.

9. The vehicle control system of claim 8, wherein:
    said at least one vehicle control device is a steering wheel; and
    said at least one control parameter varied by said controller comprises the vehicle's brakes.

10. The vehicle control system of claim 9, wherein:
    said controller brakes more on a first side of the vehicle to provide at least a portion of said yaw moment.

11. The vehicle control system of claim 10, wherein:
    said vehicle control system includes an active steering system that varies steering wheels of the vehicle to provide at least a portion of said yaw moment.

12. The vehicle control system of claim 8, wherein:
    said vehicle control system includes an active steering system that varies steering wheels of the vehicle to provide at least a portion of said yaw moment.

13. The vehicle control system of claim 8, wherein:

upon determining that the vehicle is in a rut, said controller controls said at least one control parameter based, at least in part, on a velocity of the vehicle.

14. The vehicle control system of claim 13, wherein:

said controller does not utilize said rut exiting function if the velocity of the vehicle is below a predetermined value.

15. The vehicle control system of claim 8, wherein:

said controller determines if a wheel is slipping and controls the power supplied to the wheel to reduce slipping thereof.

16. A motor vehicle, comprising:

a chassis, a powertrain, and a vehicle control system;

said chassis including at least one steerable wheel defining a steering angle;

said powertrain including an engine and a transmission coupled thereto;

said vehicle control system including a controller, an active steering system coupled to said controller, and a braking system that is also coupled to said controller;

said active steering system including said at least one steerable wheel defining the steering angle and a steering wheel providing a driver input control angle, said active steering system further including a coupler component, an actuator component, a controller component, and a sensor component, said components of said active steering system operably interconnected such that said controller component can selectively vary said steering angle relative to said driver input control angle, said steering angle defining an expected yaw rate of the vehicle when said steerable wheel is not slipping;

said sensor component configured to provide said controller with a signal corresponding to an actual yaw angle of a vehicle;

said controller component determining if said vehicle is in a rut and controlling said braking system and said active steering system to generate a yaw moment tending to displace said vehicle in a yaw sense to thereby enable said vehicle to exit a rut.

17. The motor vehicle of claim 16, wherein:

said steering angle corresponds to an expected yaw rate of the vehicle;

said controller component determines that the vehicle is in a rut if the difference between the expected yaw of the vehicle and the actual yaw of the vehicle are greater than a predetermined amount.

18. The motor vehicle of claim 16, wherein:

said controller component determines that said vehicle is in a rut only if the velocity of the vehicle is below a predetermined value.

19. The motor vehicle of claim 16, wherein:

said controller component provides greater braking on a first side of said vehicle than on a second side of said vehicle to provide said yaw moment.

20. The motor vehicle of claim 16, wherein:

said controller component sets said steerable wheel to an optimum angle for exiting a rut based on at least one environmental parameter.

21. The motor vehicle of claim 20, wherein:

said at least one environmental parameter is the coefficient of friction of soil in contact with wheels of said vehicle.

* * * * *